(No Model.)
J. S. WILSON.
DRESS CHART.
No. 375,972. Patented Jan. 3, 1888.
2 Sheets—Sheet 1.
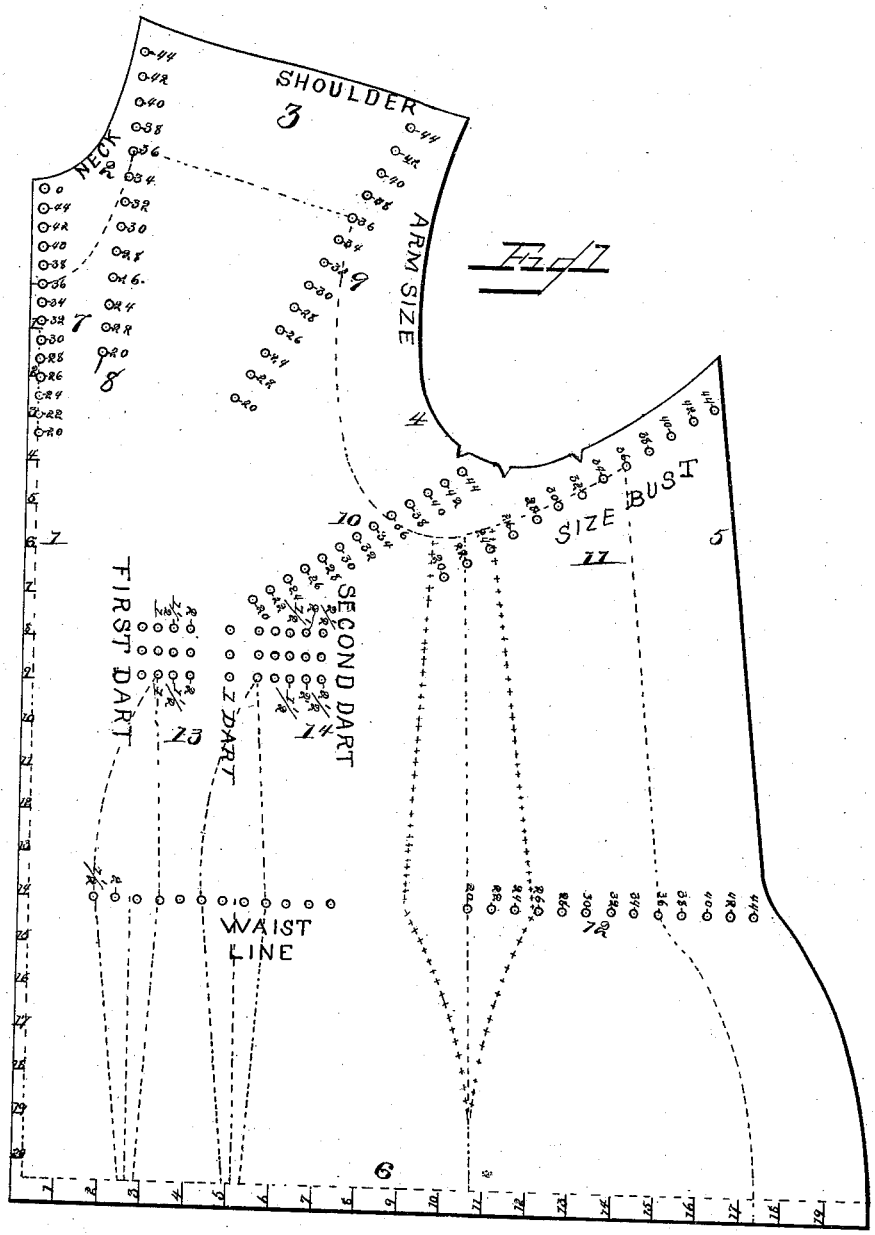

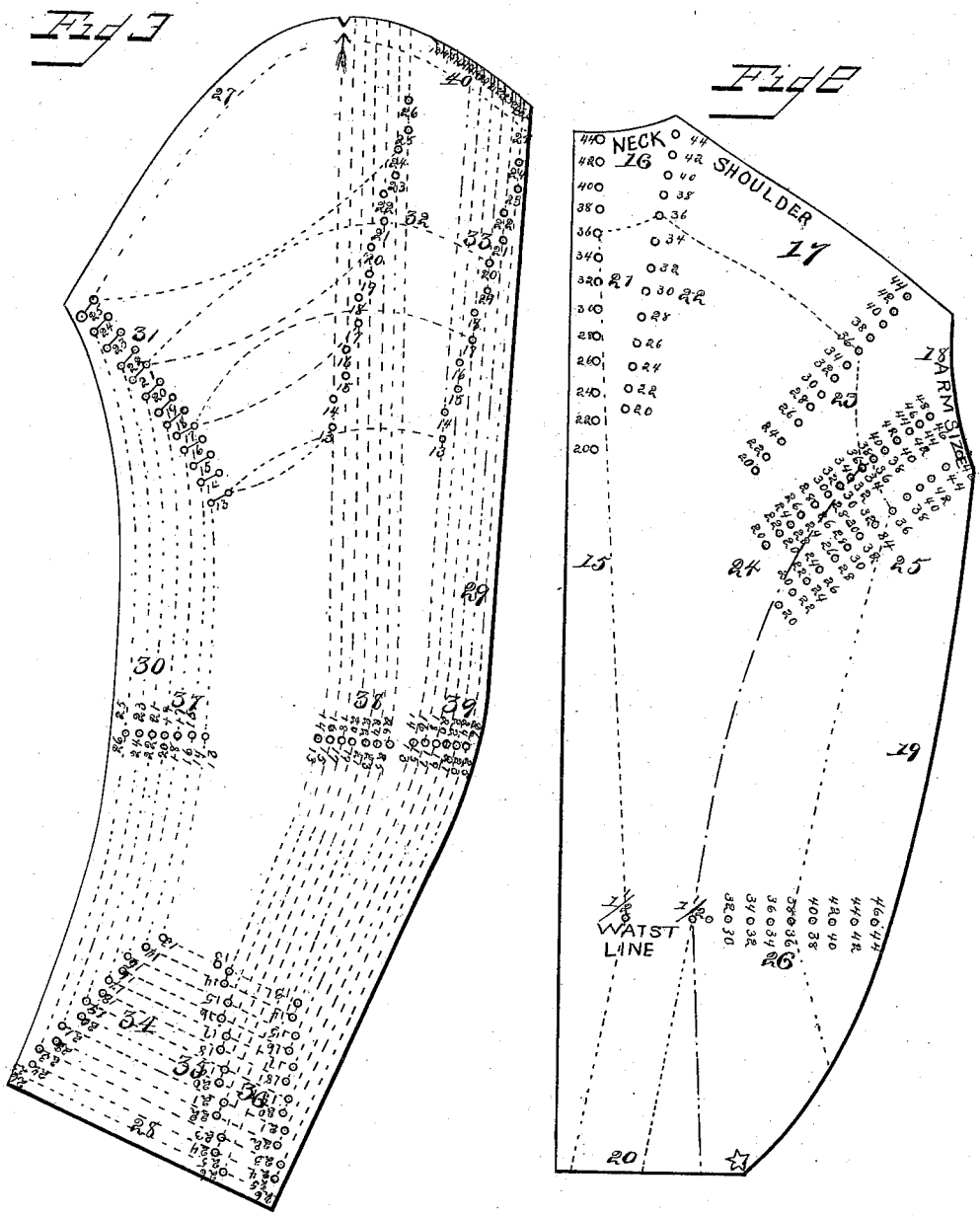

UNITED STATES PATENT OFFICE.

JOSEPHINE SARAH WILSON, OF SAN JOSÉ, CALIFORNIA.

DRESS-CHART.

SPECIFICATION forming part of Letters Patent No. 375,972, dated January 3, 1888.

Application filed August 18, 1887. Serial No. 247,244. (No model.)

*To all whom it may concern:*

Be it known that I, JOSEPHINE SARAH WILSON, a citizen of the United States, and a resident of San José, in the county of Santa Clara and State of California, have invented certain new and useful Improvements in Dress Cutting and Fitting; and I do hereby declare that the following is a full, clear, and exact description of the invention, which will enable others skilled in the art to which it appertains to make and use the same, reference being had to the accompanying drawings, which form a part of this specification, and in which—

Figure 1 represents the front or bust scale, Fig. 2, the scale for the side and back, and Fig. 3 the scale for the sleeve.

My invention relates to charts for cutting dresses and other garments; and it consists in providing such charts with such means as that they can be adapted to or used for cutting garments of different sizes, as will be hereinafter more fully described and claimed.

In the drawings for the front or bust, 1 indicates the front line; 2, the neck; 3, the shoulder; 4, the arm-size; 5, the side or hip, and 6 the bottom. Upon this chart are placed several series of holes or perforations, 7, 8, 9, 10, 11, and 12, by means of which it can be used for the different sizes, the holes in each row having figures placed beside them which indicate the different sizes or measurements which are used in cutting, and which generally range from 20 to 44. Besides the series of holes above referred to for determining the size of the pattern to be cut, two other series, 13 and 14, are made about midway of the chart for locating and cutting the first and second darts or gores. The edges of the chart for the different parts are to be used for giving the proper shape to the pattern to be cut, as will be hereinafter described.

In the chart for the side and back, 15 indicates the middle or central line; 16, the neck; 17, the shoulder; 18, the arm-size; 19, the side, and 20 the bottom. This chart is also provided with the series of holes or perforations 21, 22, 23, 24, 25, and 26, which are also provided with numbers similar to and for the same purpose as in the chart for the front, except the row 24, the holes of which are to be provided with two numbers each, and also a part of the holes in No. 26.

In the different charts I have shown the method of its application, an ordinary measurement being taken and indicated in dotted lines, in which the bust-measurement is 36; waist, 26; length of waist, 14; length of back, 16; height of dart, 5; and hips, 42. To lay off the lines indicated by the dotted lines, the chart is first placed upon the goods or fabric to be cut, leaving one inch for seams, except at the neck and armholes. Dot all of the perforations numbered 36 except the waist-line 12. Now place the edges of the chart so that it will pass through the dots, indicating those parts of the pattern, respectively, as the front, neck, and shoulder, and draw a line along the edge of the chart from the one dot to the other, which will thus give the desired outline or pattern for those measurements. In laying off the arm-size, place the first V-shaped notch in the arm-size upon the series of holes 10, which is nearest it, and which will necessitate the moving or swinging of the chart upon this point to lay off the pattern between 9 and 10 and then between 10 and 11. To lay off the waist, measure down the front, from the 36 notch in front, the proper length of the waist, which, in this instance, is fourteen inches, after which the perforation 36 in the waist-line 12 can be dotted and the side or hip line, 5, laid off in the same manner as the lines for the neck, shoulder, &c.

To lay off the darts I take one-ninth of the difference between the bust and waist measure, which will indicate the distance that the first dart is to be from the front of the pattern on the waist-line, and which in this instance would be one and one-ninth; but, as I find any woman can count a half easier than other fractions, I make the distance one and a half instead of one and one-ninth.

To determine the amount to be taken out for the darts of the different sizes I use the following table: When the difference between the bust and waist measurements is eight inches, take one inch out of first dart and one and a half inch out of second dart; nine inches, one and a half inch out of first dart and one and a half inch out of second dart; ten inches, one and a half inch out of first dart and one and a half inch out of second dart; eleven inches, one and a half inch out of first dart and two inches out of second dart; twelve inches, two inches out of first dart and two inches out of second dart; thirteen inches, two inches out of first dart and two inches out of second dart; fourteen inches, two inches out of first dart and two and a half inches out of second dart; fifteen inches, two inches out of first dart and two and a half inches out of second dart. After these darts have been taken out, the waist will still be found to be too large by the difference between the true waist and twice the sum of the back (one and one-half inch,) side form, (two and one-half inches,) and the front form in the waist-line, (fifteen inches,) less the amount (three inches) taken out of the front pattern on the waist-line for the darts, and which is in this instance the difference between 26 and 32, or six inches. I then take out one-half of this, or three inches, at each hip, as indicated by the lines of stars on the front pattern. Of course this measurement cannot be had until after the back and side forms have been laid off.

To draft the back, place the scale edge on the edge of the cloth, dot the perforations 36 in rows 21 22 23 and the perforation indicated by the 36 on the upper side of the row 24. The perforation on the waist-line is made one and a half inch from the front to allow for the seam, and the next perforation is one and a half inch from that, being the size of the back form at the waist. The outline between these dots is traced in the same manner as that described for the front chart, with the exception that the side line is traced by turning the chart end for end and placing the point of the chart indicated by the star at the point 36 in the row 24, and using the edge 19 down to the second perforation on the waist-line.

To lay off the side form, which is always the most difficult to learn, I use the same chart as for the back, using the perforation indicated by the numbers upon the lower side of the row 24, those in row 25, and also on the waist-line numbered 26, and the second perforation in the waist-line. One edge of this form, which is indicated by dots and dashes and corresponds with the side line of the back form, is laid off by reversing the chart and using the edge 19 in the same manner as that described for the back form, and the other edge is laid off by turning the pattern upside down and placing the upper end of the edge 19 upon the perforation in the row 25 and extending down to the perforation in the row 26.

In drafting odd numbers, dot the perforation indicated by the numbers above and below the odd number, and then place the edge of the chart half-way between the said two dots and lay off the pattern in the same manner as above described. The outlines of the charts for the different parts are to be extended some five or six inches below the waist-line for the hips and bustle, as no definite measurement can be given for these.

In the chart for the sleeve, 27 indicates the top of the sleeve, 28 the bottom, and 29 and 30 the edges. The top and bottom of the chart are each provided with rows of perforations 31 32 33 and 34 35 36, the row 31 being a double row, while the middle portion of the chart is provided with three rows, 37, 38, and 39. The holes of each of these rows are provided with numbers which indicate the different sizes for which the pattern is to be used, and a series of numbers, 40, is to be placed upon the upper end of the chart. The measurements for the sleeves are taken as follows: The length around the arm, above the elbow, and around the hand across the thumb. The chart is then placed on the fabric, and the perforations indicated by the same numbers in each of the rows 31, 33, 39, 36, 34, and 37 are then dotted for the upper part of the sleeve, the outer perforation in the double row 31 being used for the top and the inner row for the lower part of the sleeve. The chart is then moved down until the number in the series of numbers 40 corresponding with the number of the dot in the row 33 is over the dot, when the top of the sleeve can be laid off by tracing around the edge of the pattern. The bottom and sides of the sleeve are then laid off by the edges of the chart in the same manner as that described for the front, back, and side. To lay off the lower side of the sleeve, the perforations in the rows 31, 32, 38, 35, 34, and 37 are then dotted, the inner holes of the row 31 being used instead of those in the outer row. To lay off the top of the sleeve the chart is turned end for end, and the notch indicated by the arrow is placed upon the dot in the row 31, and the outline then traced to the dot in the row 32, which gives the proper shape for the upper end or slot of the under part of the sleeve. The outline for the bottom and sides of the same is then traced in the same manner as on the upper part of the sleeve. In the chart for the sleeve I have shown in dotted lines the outlines for the sizes 25 and 13, the outlines of the other sizes being drawn in the same manner as for these two.

Having thus described my invention, I claim and desire to secure by Letters Patent of the United States—

In a chart for fitting and cutting garments, the front or bust form having rows of holes for the different sizes and for the gores or darts, the edges of the form being adapted to be used for laying off the outline of the different sizes, and the edge of the arm-size being provided with notches.

In testimony that I claim the foregoing as my own I have hereunto affixed my signature in presence of two witnesses.

JOSEPHINE SARAH WILSON.

Witnesses:
D. T. BRYANT,
CHAS. CLARK.